May 10, 1949.　　　　J. M. PETERS　　　　2,469,781
LENS HOLDER FOR PROJECTOR ENLARGERS AND CAMERAS
Filed Jan. 16, 1948
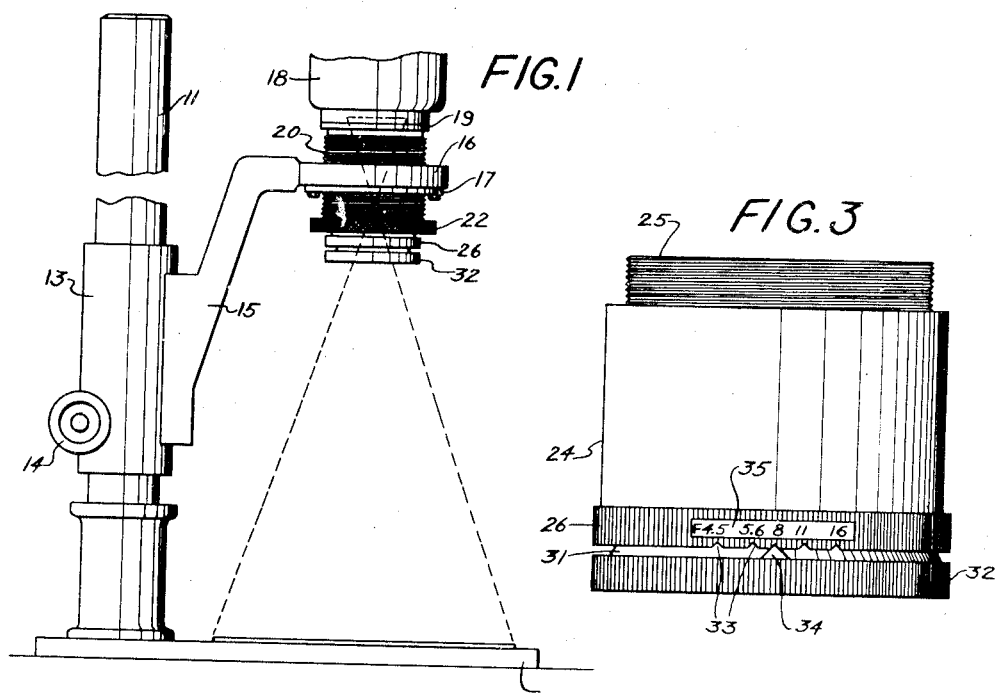
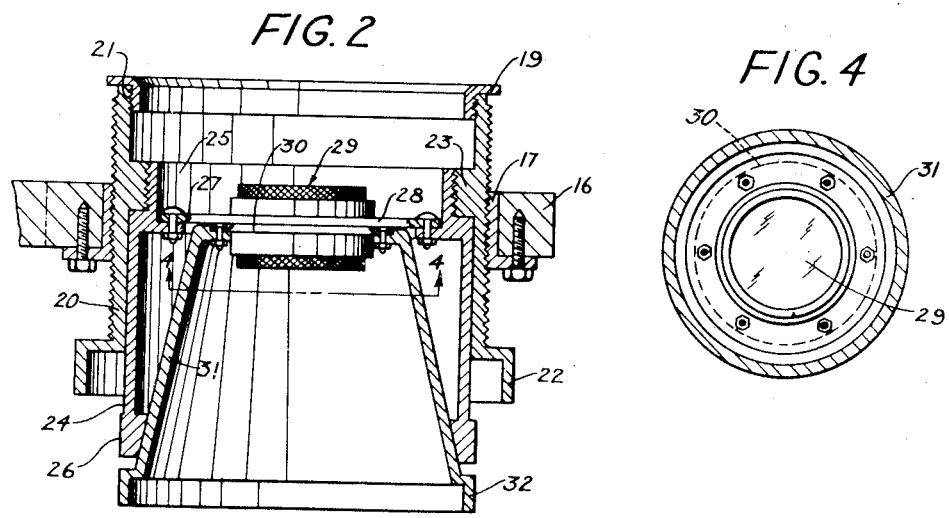
INVENTOR.
JERRY M. PETERS
BY
McMorrow, Berman & Davidson
Attorneys Patented May 10, 1949

2,469,781

UNITED STATES PATENT OFFICE 2,469,781

LENS HOLDER FOR PROJECTOR ENLARGERS AND CAMERAS

Jerry M. Peters, Walker, Mo.

Application January 16, 1948, Serial No. 2,731

2 Claims. (Cl. 88—57)

This invention relates to lens supports for enlargers and for enlarging cameras, and more particularly to a lens support which facilitates rapid changing of lenses and which provides improved means for varying diaphragm apertures especially under darkroom conditions.

In enlarging negatives of different sizes with the same enlarging camera it is necessary to employ lenses of different focal distances, each lens corresponding to a negative of a particular size. This necessitates changing the lens of the camera each time a negative is to be enlarged which is substantially different in size than the previous negative.

A main object of the invention is to provide a novel and improved lens mount for enlarging cameras which may be easily and rapidly detached from the camera and replaced by a similar lens mount carrying a lens of required focal distance.

A further object of the invention is to provide an improved lens mount for holding conventional lens assemblies of the type having a rotatable diaphragm-changing ring incorporated therein, the lens mount providing means for actuating the diaphragm-changing ring in a positive and efficient manner under dark room conditions.

Further objects and advantages of the invention will become apparent from the following description and claims, and from the accompanying drawings, wherein:

Figure 1 is a side elevational view of a lens mount constructed according to the invention, shown in relation to the lower portion of an enlarging camera with which it is employed.

Figure 2 is a vertical cross-sectional view taken through the lens mount illustrated in Figure 1.

Figure 3 is an elevational view of the lens holding barrel employed in the lens mount of Figures 1 and 2, showing the indicating means associated with the diaphragm changing mechanism of the lens.

Figure 4 is a cross-sectional detail view taken on line 4—4 of Figure 2.

Referring to the drawings, 11 designates a conventional supporting post carried on a flat base 12, a vertically adjustable sleeve member 13 being mounted on post 11, said sleeve member having a manually operated adjusting knob 14 for varying its height above the base 12. Secured to sleeve 13 is an arm 15 which is formed at its upper end with a ring member 16. Secured in ring member 16 is a flanged internally threaded sleeve element 17.

Designated at 18 is the lower end of a conventional enlarging camera, said camera carrying a flanged externally threaded ring member 19 which is ordinarily employed for securing the camera to a suitable barrel fastened within sleeve element 17, said barrel containing the camera lens.

Designated at 20 is an externally threaded sleeve member threaded into sleeve element 17 and formed at its top end with internal threads 21. Ring member 19 is threaded into sleeve member 20 at threads 21, thereby supporting the camera 18. At its lower end, sleeve element 20 is formed with an outwardly offset knurled annular skirt 22, enabling the sleeve element 20 to be rotated in the internally threaded sleeve element 17 for making vertical adjustments of element 20 with respect to ring member 16.

Sleeve member 20 is formed at its upper portion with an inwardly projecting threaded annular rib 23. Designated at 24 is a barrel member formed at its top end with a reduced externally threaded cylindrical flange 25 which is threaded into the rib 23. Barrel member 24 is formed with a knurled rim 26, located below skirt 24 and employed for manually threading or unthreading the barrel member respectively into or out of the rib 23.

At its upper portion, barrel member 24 is formed with an inwardly projecting annular flange 27. Secured to flange 27 is the supporting ring 28 of a conventional lens assembly, indicated generally at 29. Lens assembly 29 is provided with a diaphragm-changing ring 30 which, when rotated with respect to ring 28, changes the effective aperture size of the lens assembly 29. Secured to ring 30 is a downwardly flaring skirt member 31 formed with a knurled annular bottom rim 32 which underlies and is spaced from the knurled bottom rim 26 of barrel member 24. By holding rim 26 and rotating rim 32 the diaphragm of the lens assembly 29 may be adjusted to a desired aperture size. As shown in Figure 3, the bottom surface of rim 26 is formed with spaced notches 33 and rim 32 carries a tapered upstanding lug 34 engageable in said notches, each notch representing a predetermined aperture size, as indicated by a scale 35 carried on the rim 26. The skirt member 31 is made of material which is sufficiently yieldable to allow the lug 34 to be disengaged from the notches 33 whenever adjustment of the lens diaphragm is required. By counting the number of notches 33 engaged by lug 34 as the rim 32 is rotated with respect to rim 26, the operator may set the diaphragm to a predetermined aperture size without referring to the scale 35, as under darkroom conditions when said scale is not visible.

When it is desired to change a lens, the operator grasps knurled rim 26 and unscrews the barrel 24 from the rib 23, the knurled skirt 22 being meanwhile held stationary. A different barrel 24 containing the desired lens is then screwed into rib 23 in place of the original barrel.

Although specifically illustrated in Figure 1 in connection with an enlarging camera 18, the camera may be replaced by a conventional enlarging head, including a lamp housing and negative holder, whereby the lens mount of the present invention may be used in making enlarged prints as well as in making enlargements of negatives.

Although a specific embodiment of a changeable lens mount for enlarging cameras and the like has been disclosed in the foregoing, it will be understood that various modifications within the spirit of the invention may occur to those skilled in the art. Therefore, it is intended that no limitations be placed on the invention except as defined by the scope of the appended claims.

What is claimed is:

1. In an enlarging camera, support means including a horizontal internally threaded ring member, a sleeve member threadedly engaged in said ring member, means at the top of said sleeve member for attaching the lower portion of the camera thereto, said sleeve member being formed with an internal threaded rib, a barrel member threadedly engaged at its top portion with said rib, the bottom rim of said barrel member being below the bottom rim of the sleeve member, said barrel member being formed with an inwardly extending annular flange, a lens assembly secured to said flange, said lens assembly being of the type having a rotatable diaphragm-operating ring, a downwardly flaring skirt member secured to said ring, the bottom rim of said skirt member extending below the bottom rim of said barrel member, the barrel member rim being formed at its bottom surface with a plurality of spaced recesses, and an upstanding lug carried by the skirt member bottom rim selectively engageable with said recesses.

2. A changeable lens mount for a vertical enlarging camera comprising a horizontal internally threaded ring member, a sleeve threadedly engaged in said member, means for attaching the camera to the top of the sleeve, a vertical barrel member removably secured to said sleeve below the camera area, a lens assembly secured to the barrel coaxially with the camera, said lens assembly having a rotatable diaphragm-operating ring, a downwardly flaring skirt secured to the ring for rotation therewith, said skirt having a bottom rim extending below the bottom edge of the barrel, said barrel having spaced recesses along its bottom edge, and a lug secured to said skirt to engage said recesses as the skirt member is rotated.

JERRY M. PETERS.

REFERENCES CITED

The following references are of record in the file of this patent:

UNITED STATES PATENTS

| Number | Name | Date |
|---|---|---|
| 1,417,527 | Howell | May 30, 1922 |
| 2,061,192 | Gaty | Nov. 17, 1936 |
| 2,116,704 | Laube et al. | May 10, 1938 |
| 2,135,074 | Grant | Nov. 1, 1938 |
| 2,254,537 | Nerwin | Sept. 2, 1941 |
| 2,303,920 | Drucker | Dec. 1, 1942 |
| 2,381,228 | Schmidt | Aug. 7, 1945 |
| 2,411,777 | Czarnikow | Nov. 26, 1946 |